United States Patent
Ghosh et al.

(10) Patent No.: US 7,958,160 B2
(45) Date of Patent: Jun. 7, 2011

(54) EXECUTING FILTER SUBQUERIES USING A PARALLEL SINGLE CURSOR MODEL

(75) Inventors: Bhaskar Ghosh, Burlingame, CA (US); Thierry Cruanes, Redwood City, CA (US); Rushan Chen, Belmont, CA (US); Shrikanth Shankar, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1853 days.

(21) Appl. No.: 10/841,991

(22) Filed: May 6, 2004

(65) Prior Publication Data

US 2005/0131877 A1 Jun. 16, 2005

Related U.S. Application Data

(63) Continuation-in-part of application No. 10/824,887, filed on Apr. 13, 2004.

(60) Provisional application No. 60/530,413, filed on Dec. 16, 2003.

(51) Int. Cl.
*G06F 17/30* (2006.01)
(52) U.S. Cl. ......................... 707/803; 707/769
(58) Field of Classification Search .................. 707/769, 707/999.003, 803
See application file for complete search history.

(56) References Cited

U.S. PATENT DOCUMENTS

| | | | |
|---|---|---|---|
| 4,769,772 A * | 9/1988 | Dwyer | 707/2 |
| 4,860,201 A | 8/1989 | Stolfo et al. | 364/200 |
| 5,325,525 A | 6/1994 | Shan et al. | 718/104 |
| 5,765,146 A | 6/1998 | Wolf et al. | 707/2 |
| 5,822,750 A * | 10/1998 | Jou et al. | 707/2 |
| 5,835,755 A | 11/1998 | Stellwagen, Jr. | 395/600 |
| 5,857,180 A * | 1/1999 | Hallmark et al. | 707/2 |
| 5,864,839 A * | 1/1999 | Bourgoin | 707/1 |
| 5,937,401 A * | 8/1999 | Hillegas | 707/2 |
| 6,081,801 A | 6/2000 | Cochrane et al. | 707/3 |
| 6,085,189 A | 7/2000 | Pirahesh et al. | 707/3 |
| 6,112,198 A | 8/2000 | Lohman et al. | 707/3 |
| 6,289,334 B1 * | 9/2001 | Reiner et al. | 707/3 |
| 6,411,951 B1 * | 6/2002 | Galindo-Legaria et al. | 707/3 |
| 6,430,550 B1 | 8/2002 | Leo et al. | |
| 6,466,931 B1 | 10/2002 | Attaluri et al. | 707/2 |
| 6,529,901 B1 | 3/2003 | Chaudhuri et al. | 707/3 |
| 6,622,138 B1 * | 9/2003 | Bellamkonda et al. | 707/2 |
| 6,625,593 B1 | 9/2003 | Leung et al. | 707/2 |
| 6,721,724 B1 | 4/2004 | Galindo-Legaria et al. | 707/2 |
| 6,910,032 B2 | 6/2005 | Carlson et al. | 707/3 |
| 6,928,451 B2 | 8/2005 | Mogi et al. | 707/102 |
| 6,954,776 B1 | 10/2005 | Cruanes et al. | 709/201 |
| 6,968,335 B2 | 11/2005 | Bayliss et al. | 707/10 |
| 7,020,661 B1 | 3/2006 | Cruanes et al. | 707/103 |

(Continued)

*Primary Examiner* — Don Wong
*Assistant Examiner* — Shyue Jiunn Hwa
(74) *Attorney, Agent, or Firm* — Hickman Palermo Truong & Becker LLP

(57) ABSTRACT

Techniques are provided for generating execution plans for, and executing, database statements that contain filter subqueries. Upon receiving a database statement that contains a filter subquery, the database server builds an execution plan that includes a filter operation that is fed by a subtree that corresponds to the subquery. The database server performs a cost analysis to determine whether (1) the filter operation should be parallelized, and (2) the subquery tree should be parallelized. Techniques are also described for generating plans and executing queries where (1) both the filter operation and the subquery subtree are parallelized, (2) the filter operation is parallelized but the subquery subtree operation is performed serially, and (3) the filter operation is performed serially but the subquery subtree operation is parallelized.

24 Claims, 8 Drawing Sheets

U.S. PATENT DOCUMENTS

| | | | |
|---|---|---|---|
| 7,051,034 B1 | 5/2006 | Ghosh et al. | 707/100 |
| 7,089,356 B1 | 8/2006 | Chen et al. | 711/113 |
| 7,234,112 B1 | 6/2007 | Brown et al. | |
| 2002/0038300 A1 | 3/2002 | Iwata et al. | 707/5 |
| 2003/0055813 A1 | 3/2003 | Chaudhuri et al. | 707/3 |
| 2003/0065644 A1 | 4/2003 | Horman et al. | 707/1 |
| 2003/0187831 A1* | 10/2003 | Bestgen et al. | 707/3 |
| 2003/0208489 A1* | 11/2003 | Todd | 707/8 |
| 2003/0229640 A1 | 12/2003 | Carlson et al. | 707/100 |
| 2004/0172626 A1 | 9/2004 | Jalan et al. | 717/149 |
| 2005/0004907 A1* | 1/2005 | Bruno et al. | 707/4 |
| 2005/0049996 A1* | 3/2005 | Srinivasan et al. | 707/1 |
| 2005/0131890 A1 | 6/2005 | Cruanes et al. | 707/4 |
| 2005/0132383 A1 | 6/2005 | Ghosh et al. | 719/312 |

* cited by examiner

EXECUTING FILTER SUBQUERIES USING A PARALLEL SINGLE CURSOR MODEL

PRIORITY CLAIM/RELATED CASES

This application claims the benefit of priority from U.S. Provisional Application Ser. No. 60/530,413, entitled "Parallel Shared Cursors" filed Dec. 16, 2003, which is incorporated by reference in its entirety for all purposes as if fully set forth herein.

This application is related to U.S. patent application Ser. No. 10/824,887, entitled "COMPILATION AND PROCESSING A PARALLEL SINGLE CURSOR MODEL", filed on Apr. 13, 2004, the contents of which are incorporated herein, in their entirety, for all purposes.

U.S. patent application Ser. No. 10/865,178, entitled "Communicating External Expressions Using A Parallel Single Cursor Model", filed on Jun. 9, 2004;

U.S. patent application Ser. No. 10/898,300, entitled "Dynamic Performance Views With A Parallel Single Cursor Model", filed on Jul. 23, 2004;

U.S. patent application Ser. No. 10/930,433, entitled "Executing Nested Subqueries of Parallel Table Functions in the Parallel Single Cursor Model", filed on Aug. 30, 2004;

U.S. patent application Ser. No. 10/901,411, entitled "Parallel Single Cursor Model on Multi-Server Configurations", filed on Jul. 27, 2004;

U.S. patent application Ser. No. 10/944,175, entitled "Executing A Parallel Single Cursor Model", filed on Sep. 16, 2004;

the contents of all of which are incorporated herein, in their entirety, for all purposes.

FIELD OF THE INVENTION

The present invention relates to managing data and, more specifically, to parallelizing operations that include filter subqueries.

BACKGROUND

Database applications interact with a database server by submitting to the database server commands that cause the database server to perform operations on data stored in a database. For the database server to process the commands, the commands must conform to a database language supported by the database server. One database language supported by many database servers is known as the Structured Query Language (SQL).

When a database server receives a database command from a database application, the database server must first determine which actions should be performed in response to the database command, and then perform those actions. The act of preparing for performance of those actions is generally referred to as "compiling" the database command, while performing those actions is generally referred to as "executing" the database command.

Various database languages, such as SQL, support special-purpose constructs referred to herein as "cursors". During the compilation of a query statement, the database server may perform a significant amount of preliminary work for the statement, such as parsing, semantic analysis, and query plan generation. A cursor stores the results of much of this preliminary work. For example, one set of information stored in a cursor includes the execution plan for performing the operations specified by the SQL statement.

One method of representing an execution plan is a row-source tree. At execution, traversal of a row-source tree from the bottom up yields a sequence of steps for performing the operation(s) specified by the SQL statement. A row-source tree is composed of row-sources. During the compilation process, row-sources are allocated, and each row-source is linked to zero, one, two, or more underlying row-sources. The makeup of a row-source tree depends on the query and the decisions made by a query optimizer during the compilation process. Typically, a row-source tree is comprised of multiple levels. At the lowest level, the leaf nodes access rows from a database or other data store. The top row-source, the root of the tree, produces the rows of the query that the tree implements. The intermediate levels perform various transformations on rows produced by underlying row-sources.

The row-source tree representation of execution plans is described in detail in U.S. Pat. No. 5,857,180, entitled "Method and apparatus for implementing parallel operations in a database management system", issued to Hallmark et al on Jan. 5, 1999, the entire contents of which are incorporated herein. Hallmark also describes a "row-source approach" for parallelizing the operations required by a SQL command by parallelizing portions of the execution plan of the query. The row-source approach to parallelizing queries is described in greater detail below.

Parallel Execution of a Query Using Slave SQL

Sequential query execution uses one processor and one storage device at a time. In contrast, parallel query execution uses multiple processes to execute, in parallel, suboperations of a query. For example, virtually every query execution includes some form of manipulation of rows in a relation, or table of the database management system (DBMS). Before any manipulation can be done, the rows must be read, or scanned. In a sequential scan, the table is scanned using one process. Parallel query systems provide the ability to break up the scan such that more than one process can get involved in performing the table scan.

Various techniques have been developed for parallelizing queries. Such techniques typically rely on an underlying query processing model. For example, one model (a "row-source model") for parallelizing queries is described, in U.S. Pat. No. 5,857,180, which was mentioned above. According to the row-source (iterator) model of SQL execution, data flows through the SQL operations modeled by a row-source in the form of row-vectors. Specifically, a parallel plan is built on the Query Coordinator (QC). The parallel plan is subdivided into sub-plans or sub-trees, each called a DFO (Data Flow Object), each of which are scheduled and run in parallel on a set of parallel execution slaves.

One of the main design issues in any parallel SQL execution engine is how to express and communicate these tasks or sub-plans to the parallel slave processes. According to one implementation of the row-source model, a specialized form of SQL, called slave SQL, is used to express such tasks or sub-plans. Slave SQL is standard SQL plus some extensions to support notions like data partitioning and flow of partitioned data from one DFO to another.

According to the same approach, the slave SQL, corresponding to each DFO, is sent to slaves. Upon receiving a slave SQL command, a slave compiles the slave SQL and executes the slave SQL using control information sent from the QC. The global parallel plan has a SQL cursor corresponding to each Data Flow Object (DFO). So, running a parallel query involves parsing, unparsing and executing a parallel cursor on the QC side and parsing and executing on a slave set one cursor per DFO.

When compiled by slaves, the DFO cursors expressed in slave SQL often generate special row-sources that a QC plan would never include. Given the complexity of this picture, parallel queries can be difficult to manage, monitor and tune. Also, generating slave SQL for each DFO from the physical execution plan (comprising of row-source plus some parallel annotation) is difficult and error-prone, since the compilation structures get manipulated and transformed extensively after the high level SQL gets parsed, semantic-checked, optimized and compiled into the physical row-source plan.

Parallel Execution Using a Single Cursor Model

To avoid the disadvantages associated with slave SQL, techniques have been developed for executing queries, or portions thereof, in parallel without using slave SQL to communicate to each slave the operations to be performed by the slave. Instead of generating one cursor for the query coordinator (QC) based on a database statement, and separate cursors for each DFO based on the slave SQL, the techniques involve sharing a cursor among the various participants involved in the parallel execution of the operations specified in the statement. The model used by these techniques is referred to herein as the "Parallel Shared Cursor" (PSC) model of processing, in parallel, the operations specified in SQL queries. Various aspects of the Parallel Shared-Cursor model are described in detail in the patent applications identified above in the PRIORITY CLAIM/RELATED CASES section.

Filter Subqueries

As mentioned above, queries must conform to the rules of the query language supported by the server that is to execute the queries. Most query languages provide users a variety of ways to specify information to be retrieved. For example, in the Structured Query Language (SQL), the query:

select c1
from Tout requests the retrieval of the information from column c1 from all rows of table "Tout". A subset of the information can be specified by adding a subquery to the query. For example, the subquery:

where c2 in (select c2 from Tin where Tin.c3=Tout.c3)

may be added to the above-listed query to form the query:

select c1
from Tout
where c2 in (select c2 from Tin where Tin.c3=Tout.c3)

In this example, the subquery acts as a "filter", causing the database server to return only those rows that satisfy the filter criteria specified in the subquery. Filtering rows via a predicate containing a subquery is common practice in SQL. In SQL, a subquery being used to filter rows (a "filter subquery") can appear in a WHERE clause or a HAVING clause.

Filter subqueries can be correlated or un-correlated. A subquery is said to be correlated, or have a correlation, if the subquery refers to a column from a table appearing in any outer or containing query block. For example, in the following query, the subquery (specified by Query Block 3) refers to column T1.c4 which appears in Table T1 in the outermost query block (specified by Query Block 1) and is thus correlated.

select/*+Query Block 1 */ c1
from T1
where c2 in
  (select/*+Query Block 3*/ c2
  from T2 where c3 in
    (select /*+Query Block 3 */ c3
    from T3
    where T3.c4=T1.c4));

The execution semantics of a correlated subquery appearing in the WHERE clause requires that the subquery be evaluated for each row of the table in the outer block to which it is correlated. In the simple running example, select c1
from Tout
where c2 in (select c2 from Tin where Tin.c3=Tout.c3)

the subquery (select c2 from Tin where Tin.c3=Tout.c3) has to be evaluated for each row of the outer table Tout to which it is correlated. Correlated subqueries are often unnested and joined with the outer query block. Sometimes, such unnesting is not done for semantic or cost-based reasons.

In the rowsource model of SQL execution, predicates with (1) un-correlated subqueries, or (2) correlated subqueries that cannot be unnested, can be evaluated in the rowsource tree as a FILTER rowsource. Given the increased performance made possible by parallel execution, and the advantages of using the PSC model during parallel query execution, it is desirable to provide parallelization techniques for query trees with FILTER rowsources in the PSC model.

The approaches described in this section are approaches that could be pursued, but not necessarily approaches that have been previously conceived or pursued. Therefore, unless otherwise indicated, it should not be assumed that any of the approaches described in this section qualifies as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, wellknown structures and devices are shown in block diagram form in order to avoid unnecessarily obscuring the present invention.

Functional Overview

Techniques are described hereafter for generating execution plans for, and executing, database statements that contain filter subqueries. Specifically, upon receiving a database statement that contains a filter subquery, the database server builds an execution plan that includes a filter operation that is fed by a subtree that corresponds to the subquery. The database server performs a cost analysis to determine whether (1) the filter operation should be parallelized, and (2) the subquery tree should be parallelized. Various factors used by the database server to make this determination are described hereafter.

Techniques are also described for generating plans and executing queries where (1) both the filter operation and the subquery subtree are parallelized, (2) the filter operation is parallelized but the subquery subtree operation is performed serially, and (3) the filter operation is performed serially but the subquery subtree operation is parallelized.

EXAMPLE SYSTEM

Figure 1A:
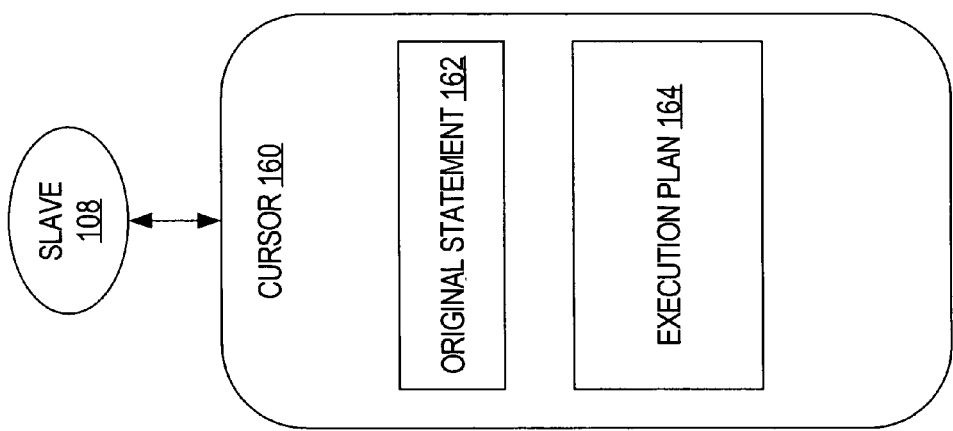
FIG. 1A is a block diagram illustrating a system in which slave processes perform work based on shared cursors and equivalent cursors, according to an embodiment of the invention.
Figure 1A:
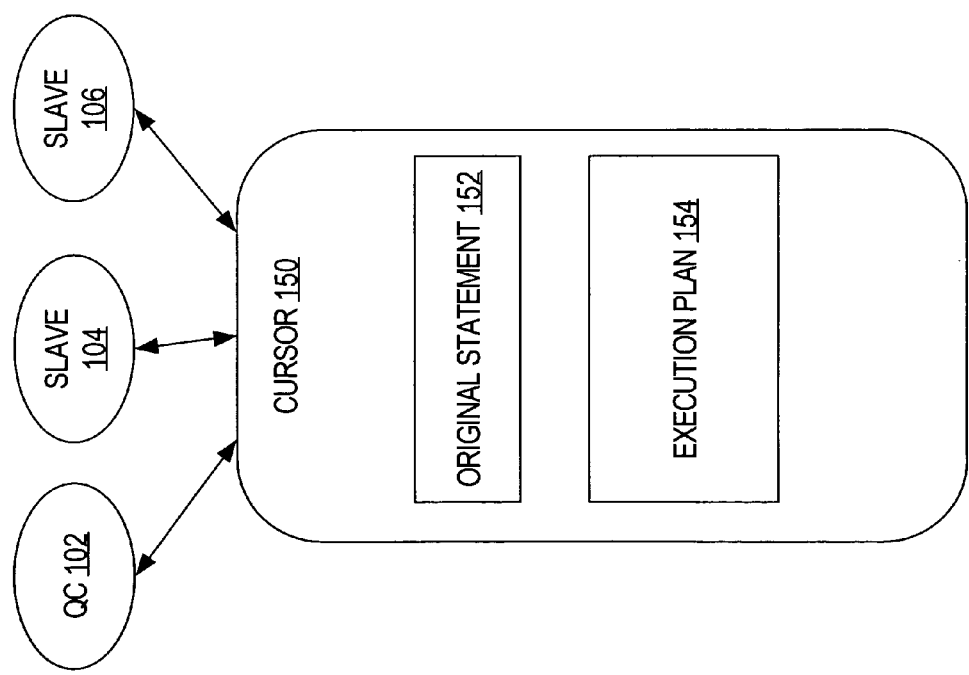

FIG. 1A is a block diagram of a system in which a single cursor is shared between several processes, according to an embodiment of the invention. Specifically, a cursor 150 has been generated by a database server based on a database statement received from a database application. In the illustrated embodiment, the cursor 150 includes the original statement 152 of the database command (typically a SQL statement) for which the cursor 150 was generated. In addition, the cursor 150 includes an execution plan 154 that describes a plan for accomplishing all of the operations specified by the original statement 152 (herein referred to as the "complete execution plan").

For the purpose of explanation, it is assumed that the database statement specifies one or more operations that can be parallelized. Consequently, the cursor 150 containing the complete execution plan is made available to a query coordinator 102 to allow the query coordinator 102 to coordinate the parallel execution of those operations.

The query coordinator 102 coordinates the parallel execution of an operation by providing to slave processes information that causes each of the slave processes to perform a portion of the parallel operation. However, the information provided to the slave processes is not in the form of slave SQL that must be separately parsed and compiled by the slave processes. Rather, as illustrated in FIG. 1A, the cursor 150 that contains the execution plan 154 used by the QC is made available to the slaves. Specifically, FIG. 1A illustrates a scenario in which two slaves 104 and 106 have access to the same instance of the cursor 150 that is being used by the query coordinator, and one slave 108 that has access to a separate instance of a cursor 160 which, as shall be explained in greater detail hereafter, is an equivalent of cursor 150.

Regardless of whether a slave has access to the same cursor instance as the query coordinator, or to an instance of an equivalent cursor, the slave is privy to the same information. For queries that share the same cursor instance as the query coordinator, that information is already in compiled form, thus avoiding the need for each slave to separately parse and compile their own cursors based on SQL fragments. Further, the information available to each slave includes the complete execution plan, and is not limited to the portion of the plan that is specific to the role of that particular slave in the execution of the plan. Because the slave is exposed to this information, the slave can make intelligent decisions with respect to how to execute its portion of the plan. For example, a slave may determine how it will execute its portion of the plan based, in part, on some characteristic of the original statement. As another example, a slave may determine how it will execute its portion of the plan based, in part, on portions of the execution plan that will be executed by other slave processes.

Correlated Subqueries in the Where Clause

The following database statement Q1 includes a correlated subquery in the WHERE clause:
select c1
from Tout
where c2 in (select c2 from Tin where Tin,c3=Tout.c3)

As explained above, upon receiving a statement, a database server first compiles, then executes the statement. As part of compilation operation, the database server generates an execution plan. A server that uses the row source model of execution plans may, for example, generate for query Q1 a serial rowsource tree that looks like:

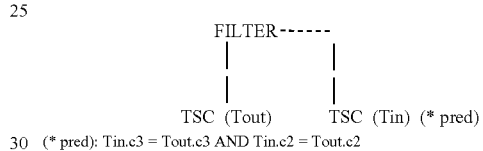

(* pred): Tin.c3 = Tout.c3 AND Tin.c2 = Tout.c2

In this rowsource tree, the rowsource sub-tree corresponding to the subquery on Tin may not be directly connected to the FILTER rowsource by tree linkage, but is instead linked to the expression used to represent the subquery in the predicate for the filter. Note that how the tree representing the subquery is linked depends on the implementation of expressions and rowsource trees in a particular SQL execution subsystem of the database server.

Using the PSC model, a database server can generate four alternative plans when it comes to deciding whether or not the operation represented by the FILTER rowsource can and should be parallelized. The decision to parallelize the filter operation can be based on the semantics of the FILTER or based on cost.

|    | FILTER   | Subquery |
|----|----------|----------|
| 1. | Parallel | Parallel |
| 2. | Parallel | Serial   |
| 3. | Serial   | Parallel |
| 4. | Serial   | Serial   |

The techniques described hereafter focus on the first three cases, since the fourth case does not involve parallelization. Specifically, the following discussion addresses where the first three cases might occur, and techniques for executing queries, using the PSC model, in each of the three cases.

The Parallelizer Rowsource

According to one implementation of the PSC model, the parallelizer rowsource (PX) is allocated above any parallel sub-plan during rowsource allocation. The PX rowsource controls the parallel execution of the tree below it. The plan immediately above the PX rowsource is serial, even though it can feed into another parallel subtree.

Case 1: Parallel Filter and Parallel Subquery

Figure 1B:
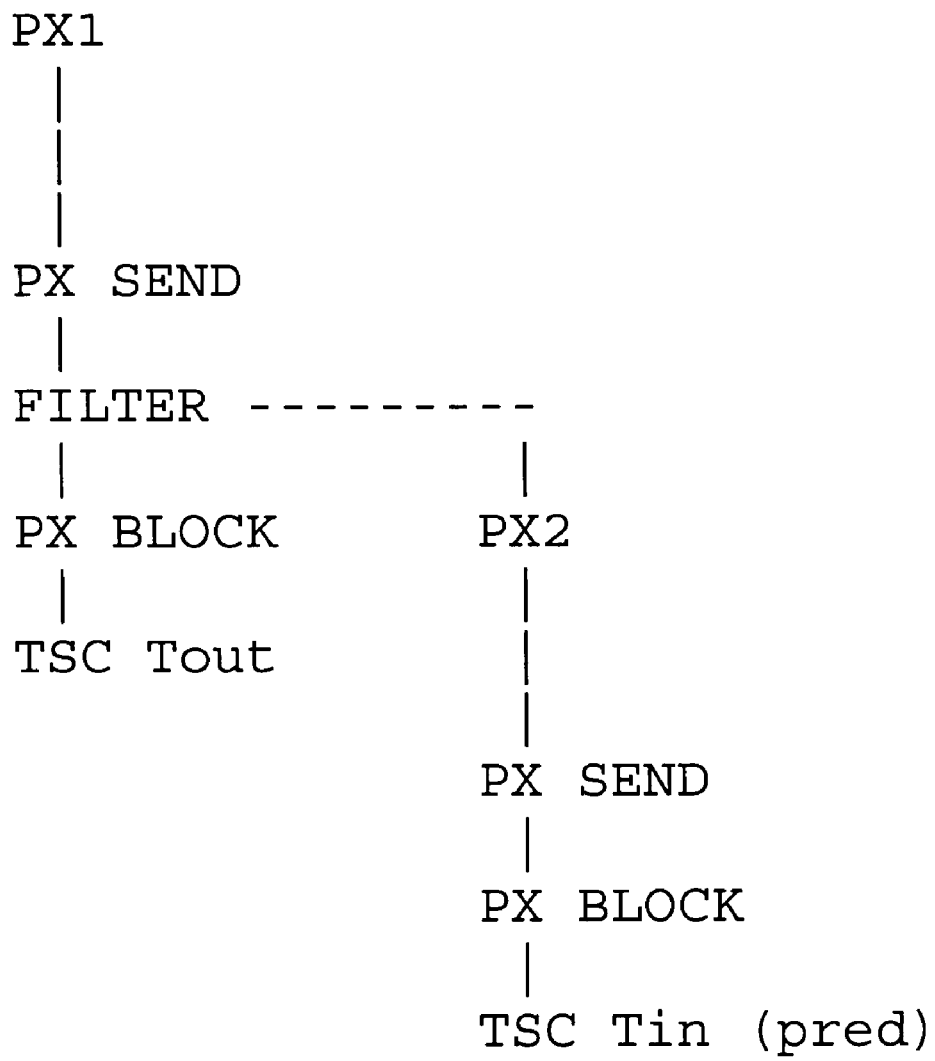
FIG. 1B illustrates an execution plan for executing a filter operation in parallel and a subquery operation in parallel.

In case number one, the database server generates an execution plan in which the operation represented by the filter rowsource is parallelized, and the operation represented by the subquery is parallelized. For example, with both the filter and subquery operations parallelized, the execution plan for query Q1 would appear as illustrated in FIG. 1B. In FIGS. 1B through 1G, a single "|" is used to represent row source linkages, while three stacked "|" represent communication connections that demarcate the DFO boundaries.

When the database server executes query Q1 in accordance with the execution plan illustrated in FIG. 1B, the filter is evaluated in parallel on the same set of slave processes that are performing the parallel scan of Tout. In this example, the plan for the subquery in the predicate is also parallel, and is controlled by the parallelizer row source PX2. Parallelizer row sources, such as PX2, that have one or more parallelizers as ancestors, are referred to herein as "nested" parallelizers.

According to one embodiment, when executing query Q1 in accordance with the execution plan illustrated in FIG. 1B, the database server would proceed as follows: A set of slaves would be assigned to scan table Tout, thereby producing rows for the filter operation. For each row from the outer query block (i.e. parallel scan of Tout) in a slave, the predicate would be evaluated by a probe into Tin. The nested parallelizer PX2, and all the special parallel rowsources in the subquery's plan (e.g. PX SEND, PX BLOCK) would go serial and the probe into Tin would be done in serial on each slave. However, since the serial probes are being performed by several slaves in parallel, the subquery itself benefits from parallelization even when the individual probe operations do not.

According to one embodiment, a two slave set model is used to execute a rowsource tree that has been broken into sub-trees or data flow objects (DFO's) where each DFO is scheduled to run on a set of slaves. In such an embodiment, to solve resultant scheduling problems, the output of a parallel DFO sometimes has to be buffered via a BUFFER SORT rowsource. If such a BUFFER SORT rowsource appears below a nested parallelizer, it turns into a pass-through rowsource when executed on a slave. Such optimizations may be performed when executing a parallel plan in serial on a parallel execution slave.

Case 2: Parallel Filter and Serial Subquery

Figure 1C:
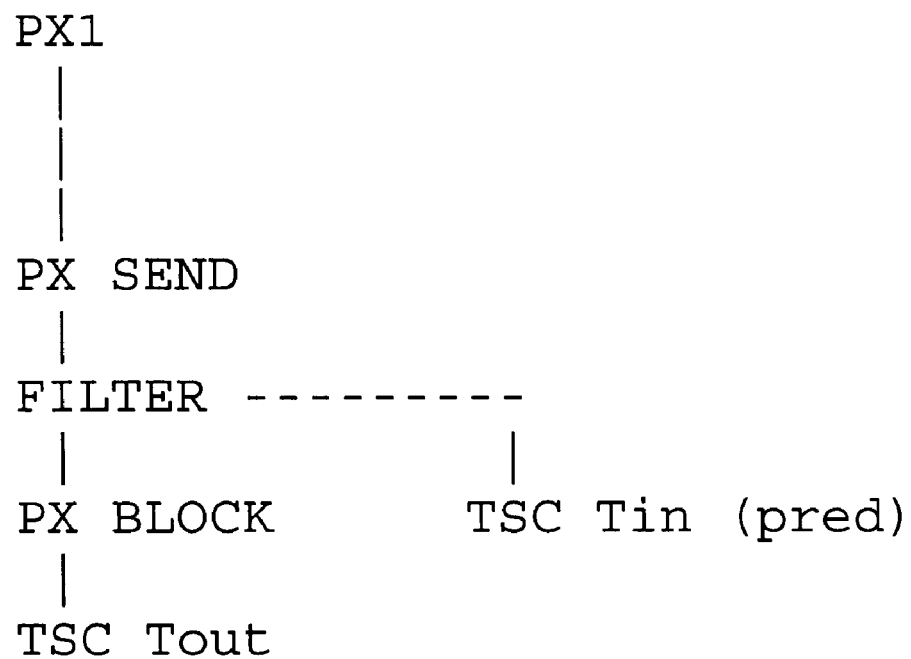
FIG. 1C illustrates an execution plan for executing a filter operation in parallel and a subquery operation in serial.

In case two, the subquery plan is serial but the FILTER can be evaluated in parallel. This scenario may occur, for example, when a user declared the table Tin to be serial. Under this scenario, the database server may generate an execution plan for query Q1 as illustrated in FIG. 1C. In this case, the execution happens exactly as in Case 1, except the pass-through optimizations are not necessary since there is no nested parallelizer PX2.

Case 3: Serial Filter and Parallel Subquery

In case 3, the FILTER operation is serialized, even though the operations associated with the underlying subtree of the outer query are performed in parallel. Under this scenario, the database server may generate an execution plan for query Q1 as illustrated in FIG. 1D.

Figure 1D:
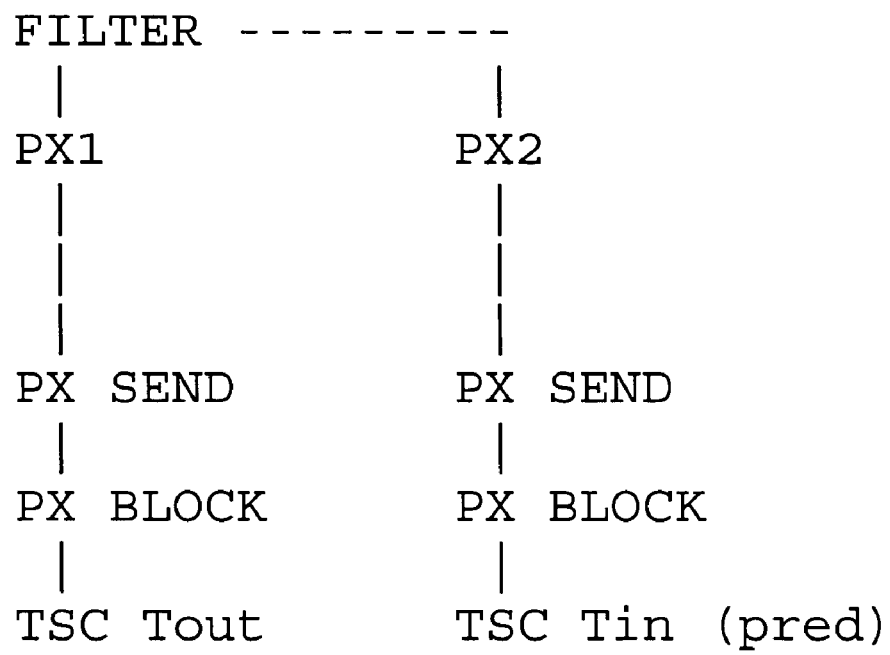
FIG. 1D illustrates an execution plan for execution a filter operation in serial and a subquery operation in parallel.

During execution of plan illustrated in FIG. 1D, the operation associated with the FILTER rowsource would be executed in serial, even though the database server would fetch each row from the outer parallel plan (via the parallelizer PX1). After fetching a row from the outer parallel plan, a probe into Tin is performed. Each probe into Tin would be executed in parallel and controlled by PX2. Performing the probe in parallel in this manner might be useful, for example, if the subquery is complex and expensive.

According to one embodiment, the database server decides wither to make FILTER go serial based on the semantics of the predicate. For example, if the filter is generated for a predicate like ROWNUM<10, then the filter has to be executed serially.

Filter Replication and Push Down

Figure 1E:
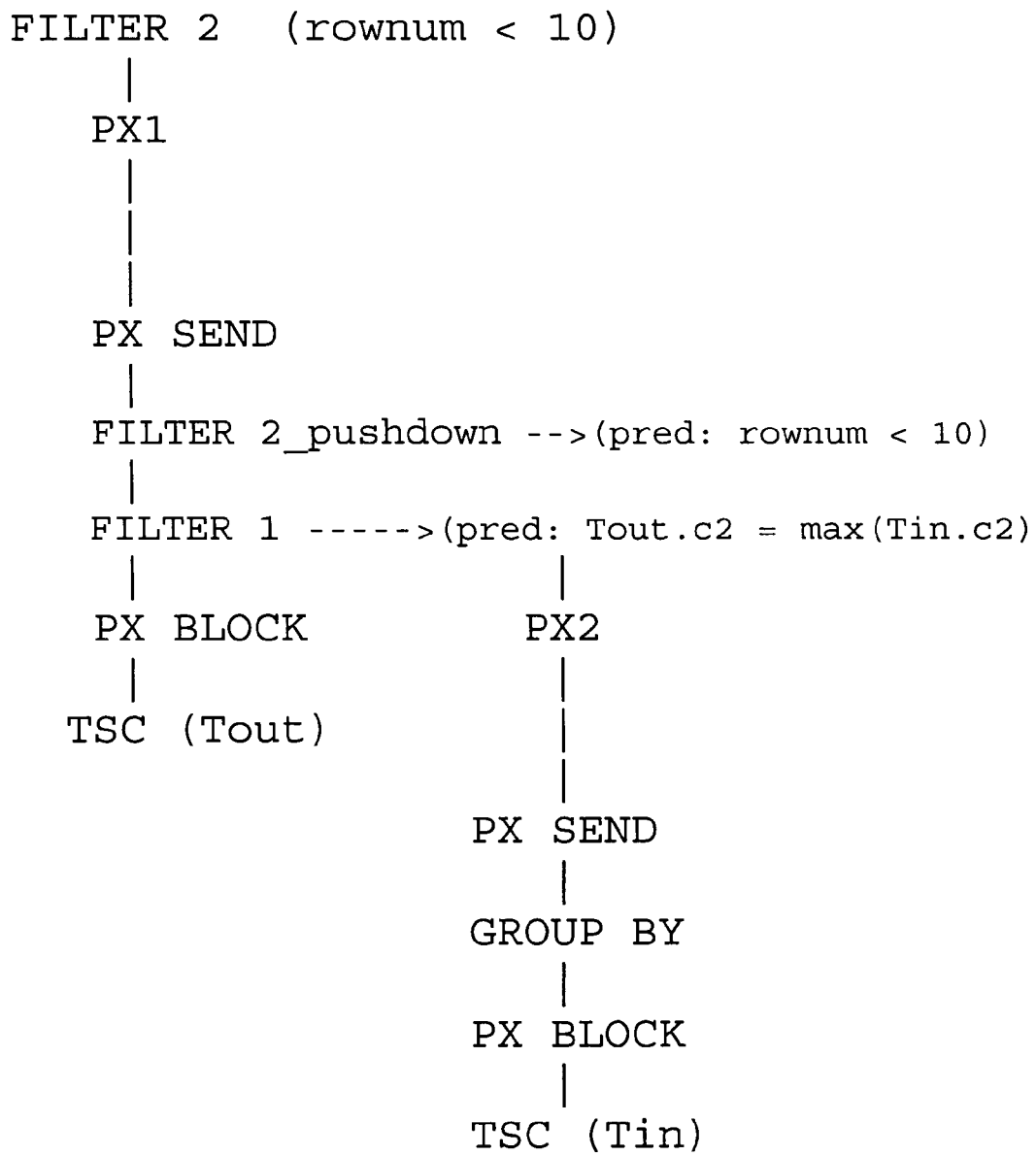
FIG. 1E illustrates an execution plan with filter replication.

According to one embodiment, if a filter cannot be executed in parallel but is highly selective (as determined by the optimizer), then the operation associated with the filter rowsource can be replicated and pushed down into the child DFO so that the communication between slaves to the PX is reduced. For example, consider the following query (Q2):
select c1
from
(select c1
 from Tout
 where c2=(select max (c2) from Tin) )
where rwnum<10;
By replicating the filter operation, and pushing down the filter operation into the DFO, the database server would generate a plan as illustrated in FIG. 1E.

For each row in the parallel table scan of Tout on a slave, the subquery corresponding to FILTER 1 will be evaluated in serial (since PX2 is a nested parallelizer), and for each row which satisfies FILTER 1, the rownum predicate corresponding to FILTER 2_pushdown is evaluated and enqueued into parallelizer rowsource PX1. In this case the traffic between the slaves executing FILTER 1 and PX1 might be substantially reduced due to the pushdown of the rownum predicate into the subquery.

Constant Filters

A constant filter is a filter that does not reference any columns from the external or containing query block and evaluates to TRUE or FALSE once and for all—i.e. it returns all or none of the rows flowing up into the FILTER.

An example of a query with a constant filter is Q3:
select c1
from
( select /*+NO_MERGE */ c1
  from Tout
  order by c2)
where SYSDATE between '1 Jun. 2003' and '30 Jun. 2003'.

Figure 1F:
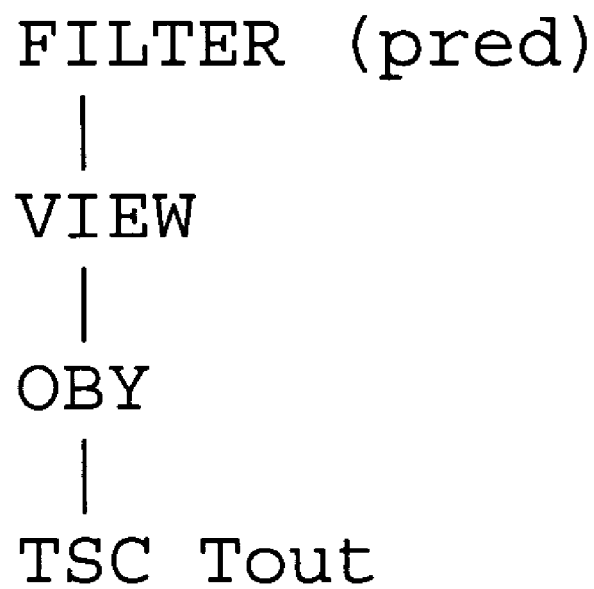
FIG. 1F illustrates a serial execution plan for a query with a constant filter.

In query Q3, the SYSDATE predicate will be evaluated via a constant FILTER rowsource at the top of the rowsource tree. The serial plan generated by a database server for query Q3 might look as illustrated in FIG. 1F.

The compilation for a constant filter is the same as for other types of filters. If the filter contains a subquery, the execution of the subquery is also the same as other filters in the PSC model. However, since a constant filter will be either TRUE or FALSE, the database server evaluates the constant filter before the start of the input row source to the filter. Therefore, the input row source might or might not need to be started based on the result of the filter evaluation.

Figure 1G:
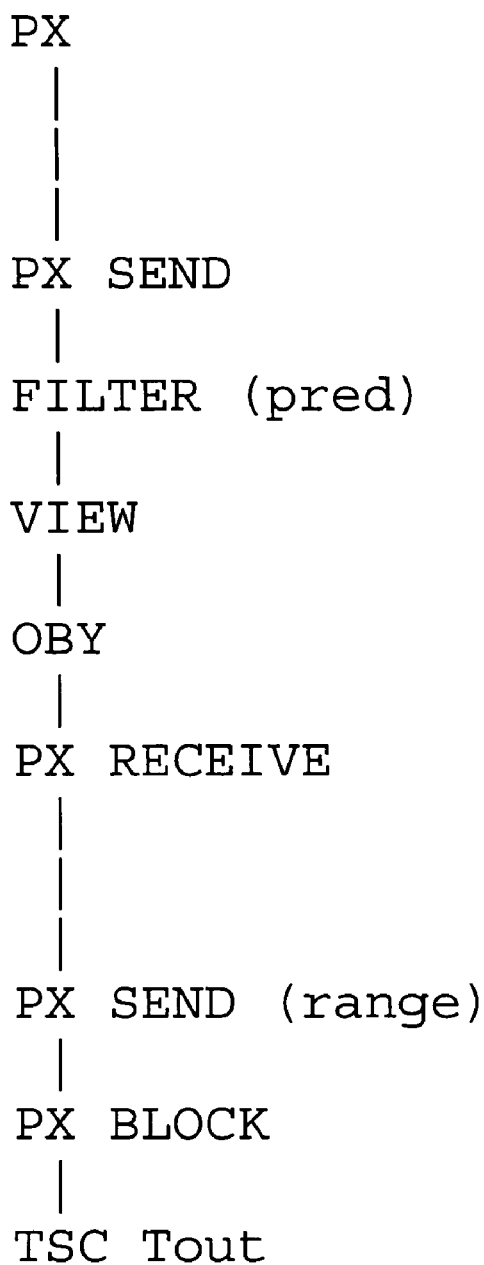
FIG. 1G illustrates a parallel execution plan for a query with a constant filter.

A database server may generate a parallel plan for query Q3 that looks as illustrated in FIG. 1G. In this case, in an embodiment that uses a two-slave set model where the protocol between the slaves executing the producer (TSC) and consumer (FILTER) DFO's requires handshaking and write-read of message buffers using a credit-bit system, DFO scheduling would require that the input row source be started even if the constant filter evaluates to FALSE.

Cost-Based Parallelization of Filter Operations

According to one embodiment, the database server determines whether to evaluate FILTER in parallel based on the cost and benefits of executing the filter operation in serial versus the cost and benefits of executing the filter operation in parallel.

In an embodiment in which the database server builds the rowsource bottom up and from the inner query blocks outwards, the parallelization of a subquery is decided prior to filter parallelization, which belongs in the outer query block. By the time the database server decides to allocate the FILTER rowsource, the cost of the plan (parallel or serial) for the subquery is known.

The database server takes into account a variety of factors in deciding whether a filter operation should be performed in parallel. According to one embodiment, the factors considered include (1) the serial costs of the subquery, (2) the parallel costs of the subquery, and (3) one or more properties of the specific filter operation.

According to one embodiment, the database server executes the filter operation in serial, instead of parallel, under any of the following circumstances:

(a) the optimizer estimate for the number of rows coming into the FILTER is small and the subquery is serial and cheap to execute (for example, an index probe has been chosen on Tin instead of a full table scan); and (b) the number of rows coming into FILTER is small but the subquery is very expensive (e.g. lots of joins) and has a parallel plan.

In the latter case, the database server may determine that it is better to serialize the filter such that each probe into the subquery is executed in parallel. In that case however, the database server has to start the entire slave group for the subquery, and the cost of spawning a large number of slaves can be non-trivial. According to one embodiment, the database server takes into account the cost of spawning slaves while measuring the benefit of a serial FILTER+parallel subquery (Case 3). For the reverse case (Case 1) of parallel FILTER+parallel subquery, the database server takes into account the cost of executing the subquery in serial inside each slave.

Hardware Overview

Figure 2:
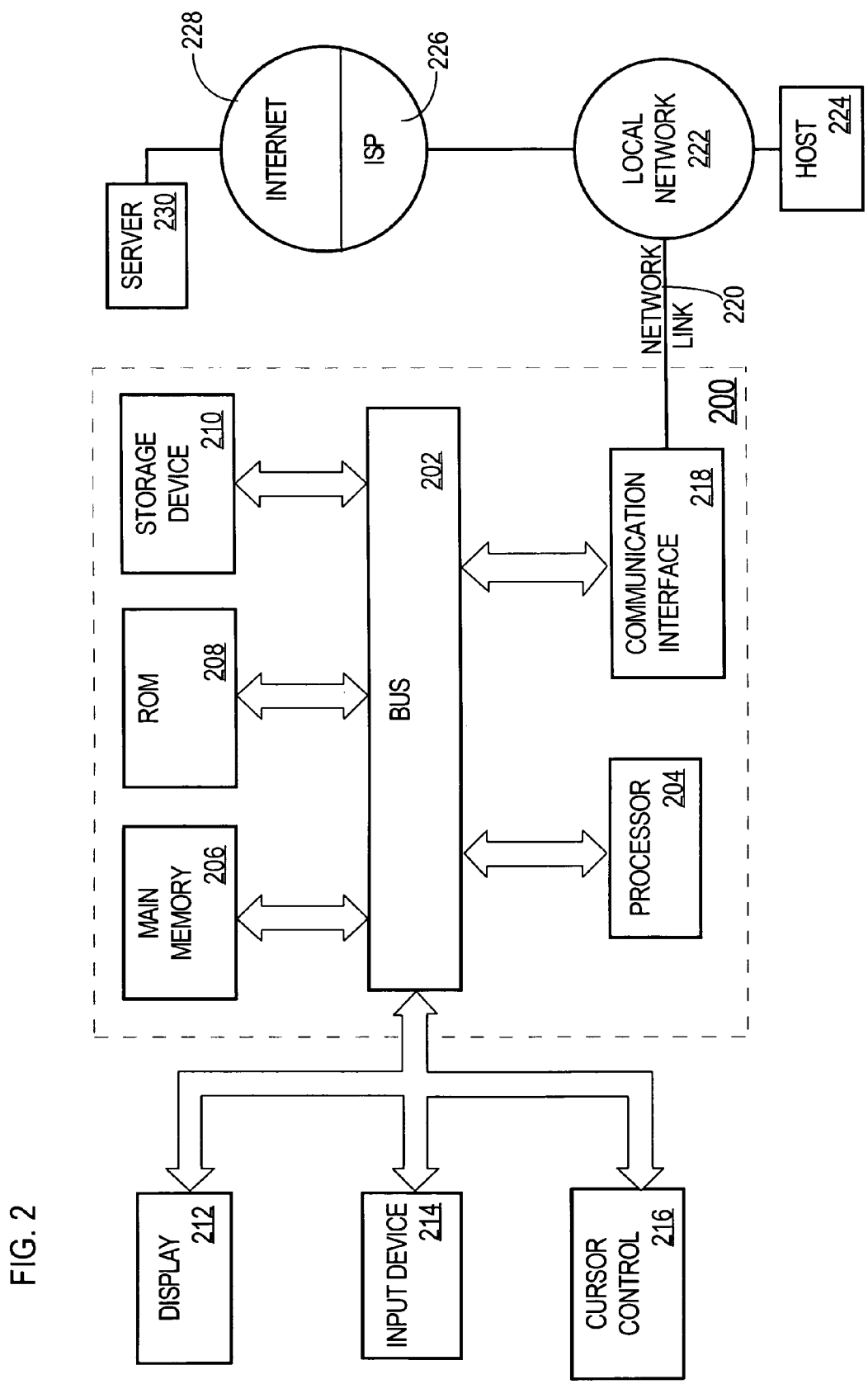
FIG. 2 is a block diagram illustrating a computer system upon which embodiments of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202.

Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising the steps of:
receiving, at a database server, a first query that includes (1) a first select statement and (2) a second query in a clause of the first query, wherein the second query includes a second select statement;
determining, at the database server, to parallelize first operation of a subquery operation or a filter operation, wherein the subquery operation is an operation required to execute the second query, wherein the filter operation uses results produced by the subquery operation;
determining, at the database server, not to parallelize a second operation, wherein the second operation is the other operation of the subquery operation or the filter operation:
wherein the database server determines not to parallelize the second operation based, at least in part, on one of more of:
a cost associated with parallelizing the second operation, data that declares an object involved in the second operation to be serial, or semantics of a predicate associated with the second operation;
generating an execution plan that includes representations corresponding to both the subquery operation and the filter operation;
using a set of slave processes to access either the execution plan or an equivalent execution plan, wherein the set of slave processes participate in parallel execution of the first operation; and
executing the second operation in serial;
wherein the method is performed by one or more computing devices.

2. The method of claim 1 wherein:
the step of generating an execution plan includes generating an execution plan that indicates that said filter operation is to be parallelized; and
the method further comprises using a same set of slave processes to both (a) scan in parallel a database object that feeds said filter operation, and
(b) evaluate the filter operation in parallel.

3. The method of claim 2 wherein the step of generating an execution plan includes generating an execution plan that indicates that said subquery operation is to be parallelized, wherein the execution plan includes a first parallelizer row source associated with the subquery operation and a second parallelizer row source associated with the filter operation, wherein the first parallelizer row source is nested below the second parallelizer row source within the execution plan.

4. The method of claim 1 wherein:
the subquery operation involves generating a first set of rows; and
the filter operation involves executing probes into the first set of rows based on a second set of rows.

5. The method of claim 4 wherein:
a plurality of filter slaves is assigned to the filter operation;
the plurality of filter slaves perform filtering based on probes performed in the subquery operation; and
each subquery operation is executed serially in a slave process.

6. The method of claim 1 wherein:
the execution plan includes a first parallelizer row source associated with the subquery operation or the filter operation;
the execution plan includes a buffer sort row source below the first parallelizer row source; and
the method further includes the step of slaves executing the buffer source row source as a pass-through rowsource.

7. The method of claim 1 wherein:
the step of generating an execution plan includes generating an execution plan that indicates that said filter operation is to be parallelized and that said subquery operation is to be performed serially;
said set of slave processes perform the filter operation in parallel; and
each slave performs the subquery operation in serial.

8. The method of claim 1 wherein:
the step of generating an execution plan includes generating an execution plan that indicates that said subquery operation is to be parallelized and that said filter operation is to be performed serially;
said set of slave processes perform the subquery operation in parallel; and
a single process is used to perform the filter operation based on probes that are performed in parallel by slaves in said set of slave processes.

9. The method of claim 8 wherein:
the filter operation involves repeatedly performing the steps of:
the single process obtaining a row; and
using the set of slaves to perform a parallel probe based on the row.

10. The method of claim 1 wherein slaves within the set of slaves filter rows produced by the subquery operation based on a predicate that is associated with the filter operation.

11. A method comprising:
receiving, at a database server, a first query that includes (1) a first select statement and (2) a second query in a clause of the first query, wherein the second query includes a second select statement;
determining, at the database server, whether to parallelize at least one of a subquery operation or a filter operation, wherein the subquery operation is an operation required to execute the second query, wherein the filter operation uses results produced by the subquery operation;
in response to determining that at least one operation of the subquery operation or the filter operation is to be parallelized:
generating and storing, in volatile or non-volatile memory, an execution plan that includes representations corresponding to both the subquery operation and the filter operation, and
using a set of slave processes that are to participate in parallel execution of the at least one operation to access either the execution plan or an equivalent execution plan;
wherein the database server determines whether to parallelize the subquery operation before determining whether to parallelize the filter operation;
wherein the method is performed by one or more computing devices.

12. A method comprising:
receiving, at a database server, a first query that includes (1) a first select statement and (2) a second query in a clause of the first query, wherein the second query includes a second select statement;
determining, at the database server, whether to parallelize at least one of a subquery operation or a filter operation, wherein the subquery operation is an operation required to execute the second query, wherein the filter operation uses results produced by the subquery operation;
in response to determining that at least one operation of the subquery operation or the filter operation is to be parallelized:
generating and storing, in volatile or non-volatile memory, an execution plan that includes representations corresponding to both the subquery operation and the filter operation, and
using a set of slave processes that are to participate in parallel execution of the at least one operation to access either the execution plan or an equivalent execution plan;
wherein the database server determines whether to parallelize the filter operation based, at least in part, on serial costs of the subquery operation and parallel costs of the subquery operation;
wherein the method is performed by one or more computing devices.

13. One or more volatile or non-volatile machine-readable media storing instructions which, when executed by one or more processors, cause:
receiving, at a database server, a first query that includes (1) a first select statement and (2) a second query in a clause of the first query, wherein the second query includes a second select statement;
determining, at the database server, to parallelize a first operation of a subquery operation or a filter operation, wherein the subquery operation is an operation required to execute the second query, wherein the filter operation uses results produced by the subquery operation;
determining, at the database server, not to parallelize a second operation, wherein the second operation is the other operation of the subquery operation or the filter operation;
wherein the database server determines not to parallelize the second operation based, at least in part, on one of more of:
a cost associated with parallelizing the second operation, data that declares an object involved in the second operation to be serial, or semantics of a predicate associated with the second operation;
generating an execution plan that includes representations corresponding to both the subquery operation and the filter operation;
using a set of slave processes to access either the execution plan or an equivalent execution plan, wherein the set of slave processes participate in parallel execution of the first operation; and
executing the second operation in serial.

14. The volatile or non-volatile media of claim 13 wherein:
generating an execution plan includes generating an execution plan that indicates that said filter operation is to be parallelized; and
the instructions, when executed by the one or more processors, further causes using a same set of slave processes to both
(a) scan in parallel a database object that feeds said filter operation, and
(b) evaluate the filter operation in parallel.

15. The volatile or non-volatile media of claim 14 wherein generating an execution plan includes generating an execution plan that indicates that said subquery operation is to be parallelized, wherein the execution plan includes a first parallelizer row source associated with the subquery operation and a second parallelizer row source associated with the filter operation, wherein the first parallelizer row source is nested below the second parallelizer row source within the execution plan.

16. The volatile or non-volatile media of claim 13 wherein:
the subquery operation involves generating a first set of rows; and
the filter operation involves executing probes into the first set of rows based on a second set of rows.

17. The volatile or non-volatile media of claim 16 wherein:
a plurality of filter slaves is assigned to the filter operation;
the plurality of filter slaves perform filtering based on probes performed in the subquery operation; and each subquery operation is executed serially in a slave process.

18. The volatile or non-volatile media of claim 13 wherein:
the execution plan includes a first parallelizer row source associated with the subquery operation or the filter operation;
the execution plan includes a buffer sort row source below the first parallelizer row source; and
the instructions, when executed by the one or more processors, further causes slaves executing the buffer source row source as a pass-through rowsource.

19. The volatile or non-volatile media of claim 13 wherein:
generating an execution plan includes generating an execution plan that indicates that said filter operation is to be parallelized and that said subquery operation is to be performed serially;
said set of slave processes perform the filter operation in parallel; and
each slave performs the subquery operation in serial.

20. The volatile or non-volatile media of claim 13 wherein:
generating an execution plan includes generating an execution plan that indicates that said subquery operation is to be parallelized and that said filter operation is to be performed serially;
said set of slave processes perform the subquery operation in parallel; and
a single process is used to perform the filter operation based on probes that are performed in parallel by slaves in said set of slave processes.

21. The volatile or non-volatile media of claim 20 wherein the filter operation involves repeatedly performing the steps of:
the single process obtaining a row; and
using the set of slaves to perform a parallel probe based on the row.

22. The volatile or non-volatile media of claim 13 wherein slaves within the set of slaves filter rows produced by the subquery operation based on a predicate that is associated with the filter operation.

23. One or more volatile or non-volatile machine-readable media storing instructions which, when executed by one or more processors, cause:
receiving, at a database server, a first query that includes (1) a first select statement and (2) a second query in a clause of the first query, wherein the second query includes a second select statement;
determining, at the database server, whether to parallelize at least one of a subquery operation or a filter operation, wherein the subquery operation is an operation required to execute the second query, wherein the filter operation uses results produced by the subquery operation;
in response to determining that at least one operation of the subquery operation or the filter operation is to be parallelized:
generating and storing, in volatile or non-volatile memory, an execution plan that includes representations corresponding to both the subquery operation and the filter operation, and
using a set of slave processes that are to participate in parallel execution of the at least one operation to access either the execution plan or an equivalent execution plan;
wherein the database server determines whether to parallelize the subquery operation before determining whether to parallelize the filter operation.

24. One or more volatile or non-volatile machine-readable media storing instructions which, when executed by one or more processors, cause:
receiving, at a database server, a first query that includes (1) a first select statement and (2) a second query in a clause of the first query, wherein the second query includes a second select statement;
determining, at the database server, whether to parallelize at least one of a subquery operation or a filter operation, wherein the subquery operation is an operation required to execute the second query, wherein the filter operation uses results produced by the subquery operation;
in response to determining that at least one operation of the subquery operation or the filter operation is to be parallelized:
generating and storing, in volatile or non-volatile memory, an execution plan that includes representations corresponding to both the subquery operation and the filter operation, and
using a set of slave processes that are to participate in parallel execution of the at least one operation to access either the execution plan or an equivalent execution plan;
wherein the database server determines whether to parallelize the filter operation based, at least in part, on serial costs of the subquery operation and parallel costs of the subquery operation.

* * * * *